United States Patent
Nicolson et al.

(10) Patent No.: US 8,989,678 B2
(45) Date of Patent: Mar. 24, 2015

(54) TRANSCEIVER AND METHOD THEREOF

(75) Inventors: Sean Timothy Nicolson, Mountain View, CA (US); Jing-Hong Conan Zhan, HsinChu (TW)

(73) Assignee: Mediatek Inc., Hsin-Chu (TW)

(*) Notice: Subject to any disclaimer, the term of this patent is extended or adjusted under 35 U.S.C. 154(b) by 265 days.

(21) Appl. No.: 13/301,002

(22) Filed: Nov. 21, 2011

(65) Prior Publication Data
US 2013/0005275 A1   Jan. 3, 2013

Related U.S. Application Data

(60) Provisional application No. 61/503,273, filed on Jun. 30, 2011.

(51) Int. Cl.
H04B 1/44 (2006.01)
H04B 1/46 (2006.01)
H04B 1/48 (2006.01)

(52) U.S. Cl.
CPC .................................. *H04B 1/48* (2013.01)
USPC ................... 455/78; 455/83; 455/80

(58) Field of Classification Search
CPC .......................................................... H04B 1/48
USPC ........... 455/127.1, 20, 550.1, 73, 78, 77, 107, 455/83, 120, 561; 333/101, 103, 104, 109, 333/125; 370/282
See application file for complete search history.

(56) References Cited

U.S. PATENT DOCUMENTS

| 4,810,980 | A | 3/1989 | Heston et al. |
|---|---|---|---|
| 5,485,130 | A | 1/1996 | Nakahara et al. |
| 6,356,536 | B1 * | 3/2002 | Repke .......................... 370/282 |
| 7,106,146 | B2 | 9/2006 | Tsukahara et al. |
| 2002/0060615 | A1 * | 5/2002 | Kodim .......................... 333/101 |
| 2003/0190931 | A1 * | 10/2003 | Fry ................................. 455/561 |
| 2004/0259505 | A1 * | 12/2004 | Vasanth ........................... 455/78 |
| 2005/0056860 | A1 * | 3/2005 | Kitazawa et al. ............. 257/107 |
| 2005/0255812 | A1 * | 11/2005 | Na et al. .......................... 455/78 |
| 2007/0262829 | A1 * | 11/2007 | Chominski .................... 333/103 |
| 2009/0298443 | A1 | 12/2009 | Ta et al. |
| 2011/0143690 | A1 | 6/2011 | Jerng et al. |

OTHER PUBLICATIONS

Shen., H.S., et al.; "A 24-GHz High-Isolation CMOS TR Switch with Leakage Cancellation Technology," Apr. 20, 2009; pp. 1-3.
Adabi, E., et al.; "A mm-Wave Transformer Based Transmit/Receive Switch in 90nm CMOS Technology;" Sep. 2009; pp. 1-4.

* cited by examiner

Primary Examiner — Andrew Wendell
Assistant Examiner — Cindy Trandai
(74) Attorney, Agent, or Firm — McClure, Qualey & Rodack, LLP

(57) ABSTRACT

The transceiver has a transmitter, a receiver, and a three-port network. The transmitter is configured to transmit an outgoing RF signal. The receiver is configured to receive an incoming RF signal. The three-port network includes: a transmission line, configured to have a line length less than a quarter of a wavelength of the incoming RF signal; an antenna port, configured to connect to an antenna; a receiver port, configured to connect the receiver to the antenna port; and a transmitter port, configured to connect the transmitter to the antenna port and the receiver port through the transmission line.

20 Claims, 7 Drawing Sheets

TRANSCEIVER AND METHOD THEREOF

CROSS REFERENCE TO RELATED APPLICATIONS

This Application claims priority of U.S. Provisional Application No. 61/503,273, filed on 30 Jun. 2011, and the entirety of which is incorporated by reference herein.

BACKGROUND OF THE INVENTION

1. Field of the Invention

The present invention relates to wireless communication, and in particular relates to transceiver circuitry for wireless communication.

2. Description of the Related Art

Wireless communications systems operate over limited spectral bandwidths for providing quality service to all users. The wireless communication system includes a built-in radio transceiver, i.e., a receiver and a transmitter. The transmitter includes a power amplifier stage for amplifying the outgoing signal prior to transmission via an antenna and the receiver includes a low noise amplifier stage for amplifying the incoming signal picked up by the antenna. The transmitter and the receiver may share a common antenna through a transmit/receive (TR) switch.

As technology advances, the radio transceiver can be fabricated on an integrated circuit. Recently, amplifier technology has made tremendous progress in terms of device such as low noise and low power, circuit computer aided design (CAD) tools, circuit fabrication, packaging, and applications. Regarding the applications at millimeter wave frequencies, the design of silicon based TR switches is challenging due to the coupling of the radio frequency (RF) signals, which simultaneously increases insertion loss and decreases port to port isolation of the switch. As a consequence, the design of a CMOS TR switch at microwave frequencies requires a careful circuit design to meet the desired requirements for such as insertion loss, isolation, and signal sensitivity.

BRIEF SUMMARY OF THE INVENTION

In one aspect of the invention, a transceiver is disclosed, comprising a transmitter, a receiver, and a three-port network. The transmitter is configured to transmit an outgoing RF signal. The receiver is configured to receive an incoming RF signal. The three-port network comprises a transmission line, configured to have a line length less than a quarter of a wavelength of the incoming RF signal; an antenna port, configured to connect to an antenna; a receiver port, configured to connect the receiver to the antenna port; and a transmitter port, configured to connect the transmitter to the antenna port and the receiver port through the transmission line.

In another aspect of the invention, a transceiver is provided, comprising a transmitter, a receiver, and a three-port network. The transmitter is configured to transmit an outgoing RF signal. The receiver is configured to receive an incoming RF signal. The three-port network comprises a transmission line, configured to have a line length less than a quarter of a wavelength of the outgoing RF signal; an antenna port, configured to connect to an antenna; a transmitter port, configured to connect the transmitter to the antenna port; and a receiver port, configured to connect the receiver to the antenna port and the transmitter port through the transmission line.

In yet another aspect of the invention, a method for a transceiver is revealed, comprising: turning on a transmitter amplifier of the transceiver, and turning off a receiver amplifier of the transceiver; and transmitting an outgoing RF signal from the transmitter amplifier to an antenna through a three-port network, wherein the three-port network comprises a transmission line, configured to have a line length less than a quarter of a wavelength of the incoming RF signal; an antenna port, configured to connect to the antenna; a receiver port, configured to connect the receiver to the antenna port; and a transmitter port, configured to connect the transmitter to the antenna port and the receiver port through the transmission line.

In still another aspect of the invention, a method for a transceiver is described, comprising: turning on a transmitter amplifier of the transceiver, and turning off a receiver amplifier of the transceiver; and transmitting an outgoing signal from the transmitter amplifier to an antenna through a three-port network, wherein the three-port network comprises: a transmission line, configured to have a line length less than a quarter of a wavelength of the outgoing RF signal; an antenna port, configured to connect to an antenna; a transmitter port, configured to connect the transmitter to the antenna port; and a receiver port, configured to connect the receiver to the antenna port and the transmitter port through the transmission line.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

A detailed description is given in the following embodiments with reference to the accompanying drawings.

Figure 1:
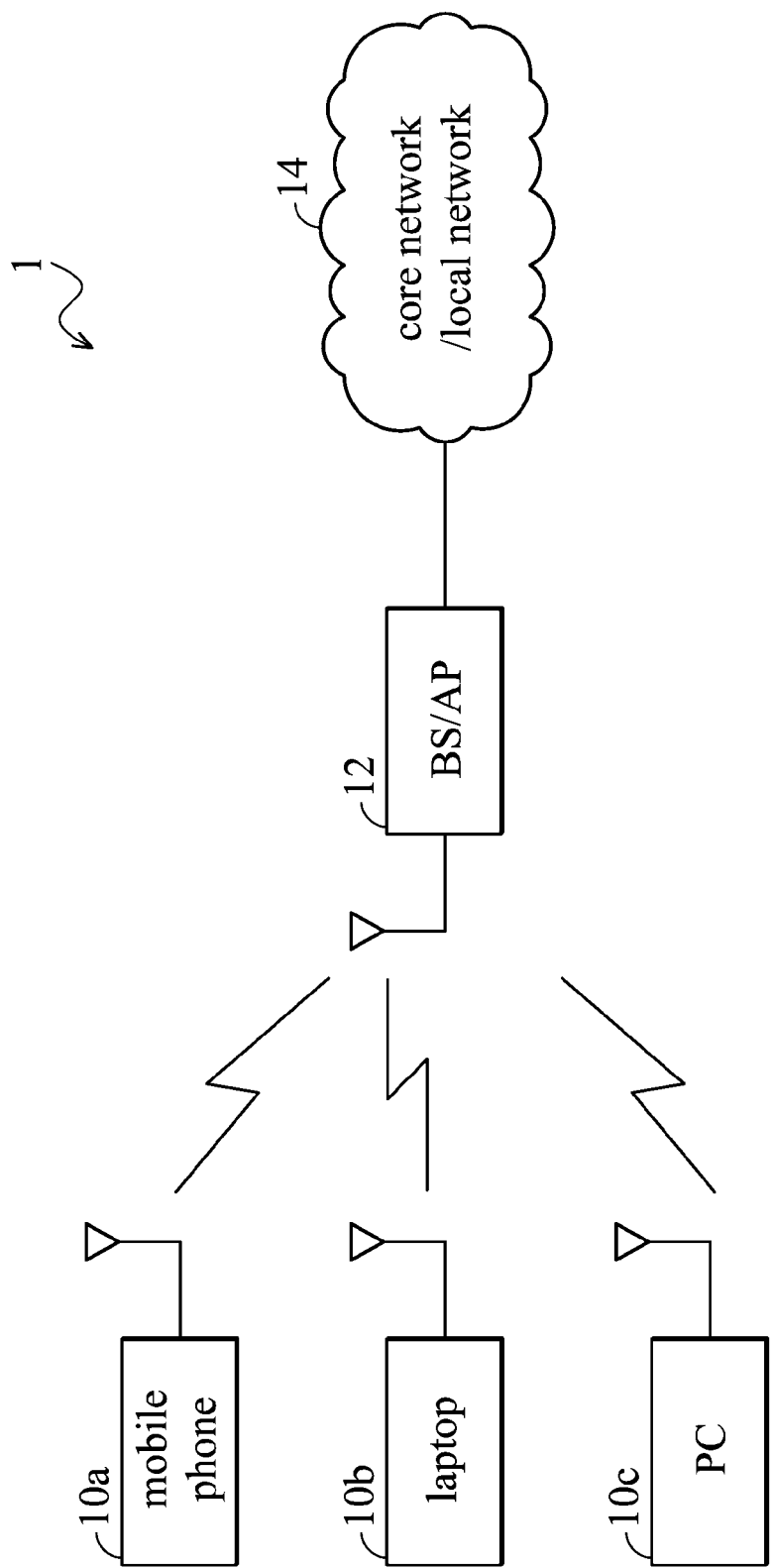
FIG. 1 is a system diagram of a wireless communication system 1 according to one embodiment of the invention.

FIG. 1 is a system diagram of a wireless communication system 1 according to one embodiment of the invention, comprising a service network and a plurality of User Equipment (UE) capable of receiving a network service therefrom. The service network may be a Wireless Local Area network (WLAN), a General Packet Service (GPRS) network, a Universal Mobile Telecommunication System (UMTS) network, a Long Term Evolution (LTE) network, or a combination thereof. The UEs 10a, 10b, and 10c are any device used directly by an end-user for communication, e.g., handheld mobile phones, laptop or personal computers equipped with broadband network adaptors, or any other device capable of communication. The service network comprises a radio access network that provides wireless communication in radio frequencies and a core network that provides network services to the wireless devices. The radio access network comprises a base station (BS) or access point (AP) 12. The core network/local network 14 provides various services including circuit-switched (CS) based services to the wireless devices by interfacing with a CS based network such as the Public Switched Telephone Network (PSTN), and Packet Switched (PS) based services by interfacing with a Internet Protocol (IP) based Network such as the Internet. The wireless communication system 1 is implemented using a time division duplexing (TDD) technique, where the UEs 10 and the BS/AP 12 communicate through uplink and downlink communications at different times, typically by asymmetrical uplink and downlink data rates. The Hardware construction of the wireless devices 10a, 10b, and 10c and BS/AP 12 are further detailed in the communication devices disclosed in FIG. 2 and FIG. 3.

Conventionally, a quarter wavelength transmission line is inserted between the transmitter and the receiver in a transceiver circuit as an isolation network. For a quarter wavelength transmission line when one end is attached to a zero load impedance such as by grounding, the other end which is a quarter wavelength away from the short circuited end becomes infinitely large or open circuited for a signal with a corresponding quarter wavelength equivalent to the transmission cable length. Consequently no signal with the frequency of the quarter wavelength cable can pass through, whereas a signal with a different wavelength can go through the transmission line. The quarter-wavelength transmission line property is applied in a conventional TR switch to isolate an LNA from a PA during a transmitter operation so that an outgoing RF signal does not go into the LNA. When the outgoing RF signal is applied by the transmitter, one end of the quarter-wavelength transmission line connected to the receiver is grounded so that the other end connected to the transmitter becomes an open line for the specific frequency of the outgoing RF signal; hence separating the receiver from the transmitter during transmission. Conversely, when an incoming RF signal is accepted by the receiver, one end of the quarter-wavelength transmission line connected to the transmitter is grounded, so that the other end connected to the receiver is opened, thus isolating the transmitter from the incoming RF signal during reception. In any case, the transmission line has the finite length of a quarter wavelength to provide the isolation between the transmitter and receiver, thus the transmitter or the receiver is at least the quarter wavelength away from the antenna, rendering a finite circuit area occupied by the transmission line, and unwanted signal loss or signal degradation.

Figure 2:
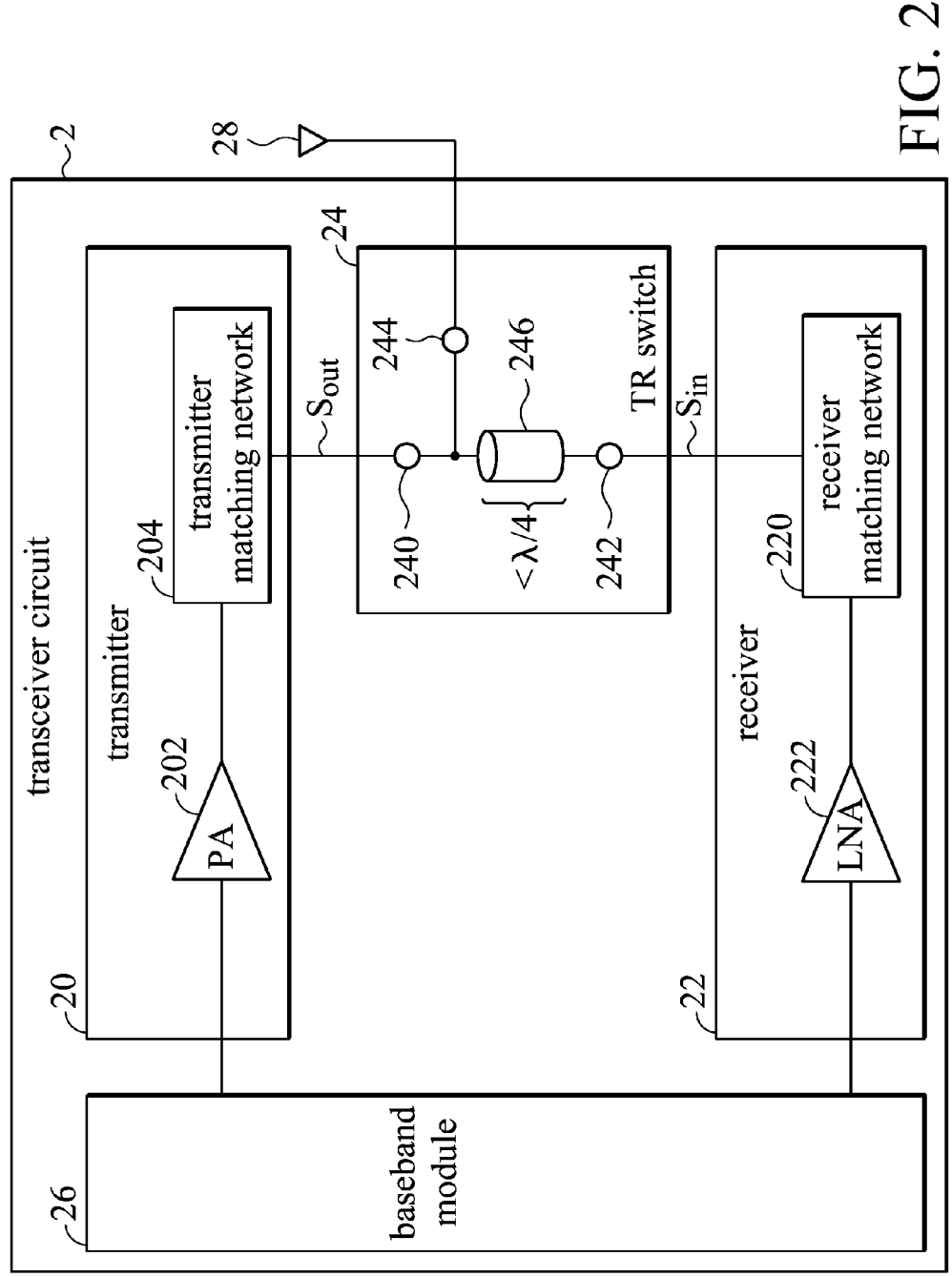
FIG. 2 is a block diagram of a radio transceiver circuit 2 according to an embodiment of the invention.

FIG. 2 is a block diagram of a radio transceiver circuit 2 according to an embodiment of the invention, comprising a transmitter 20, a receiver 22, a transmitter-receiver (TR) switch 24, and a baseband module 26. The transceiver circuit 2 may be implemented in an integrated circuit (IC) or a discrete circuit comprising the illustrated blocks. The radio transceiver circuit 2 can be incorporated in a wireless communication device such as the UEs 10a, 10b, 10c and the BS/AP 12, allowing uplink and downlink data transmission to be performed via a single antenna. The baseband module 26 is operable to generate outgoing digital signals for uplink transmission and to process incoming digital signals from downlink reception. The transmitter 20 carries out analog signal processing for the data transmission and the receiver 24 performs analog signal processing for the data reception. The TR switch 24 is a three-port device which allows the transmitter 20 and the receiver 22 to operate with a single antenna 28, and is capable of connecting and disconnecting to the antenna 28 for the transmit and receive processes. The shared antenna 28 may be built-in or external to the radio transceiver circuit 2, and shared by the transmission and reception path as controlled by the TR switch 24. The implementation of the radio transceiver circuit 2 and the antenna 28 are compliant with a communication standard to which the wireless communication device adopts.

The transmitter 20 comprises a power amplifier (PA) (transmitter amplifier) 202 and a transmitter filter 204. During the transmit process, the outgoing digital signals are outputted to a transmitter front end (not shown) for analog conversion, up-conversion, and other filtering processes, where the signal is transformed into an analog form, up-converted to a radio frequency (RF), and removed of unwanted signal components, to provide an outgoing radio frequency signal to the PA 202. The radio frequency of the outgoing RF signal $S_{out}$ is defined by the communication standard to which the wireless communication device adopts, and may be 60 GHz. The PA 202 is operable to increase transmission power of the outgoing RF signal $S_{out}$ to a predetermined power range or a predetermined power level that may be assigned by the service network. The transmitter matching network 204 may comprise resistive, inductive and capacitive components, arranged to provide output impedance matching for the PA 202, thereby increasing or maximizing power transfer of the outgoing RF signal $S_{out}$ to the antenna 28. The selection of the components for the transmitter matching network is determined by considering the data transmission condition, i.e., when the PA 202 is turned on and the LNA 222 is turned off. The transmitter matching network is constructed to transform turned-on output impedance of the PA 202 to match with the combined loading of the turned-off input impedance of the LNA 222 and antenna port loading of an antenna port 244 which is connected to the antenna 28. The transmitter matching network 204 may further include a low pass filter or a bandpass filter to reduce or remove unwanted signal components. The TR switch 24 is operable to enable a transmission path to the PA 202 and disable the LNA 222 from the antenna 28 to pass the filtered outgoing RF signal $S_{out}$ to the antenna 28 for the uplink transmission.

The receiver 22 comprises a receiver matching network 220 and a low noise amplifier (LNA) (receiver amplifier) 222. The receiver 22 receives the incoming RF signal $S_{in}$ via the antenna 28. The TR switch 24 is adapted to enable the reception path to the LNA 222 and disable the transmission path of the PA 202 from the antenna 28 to deliver the incoming RF signal $S_{in}$ for the data reception. The antenna 28 picks up and passes the incoming RF signal $S_{in}$ from air interface to the receiver matching network 220 via the TR switch 24. The receiver matching network 220 provides input impedance matching for the LNA 222, thereby increasing power transfer and reducing signal reflection of the incoming RF signal $S_{in}$. The selection of the components for the receiver matching network is determined by considering the data reception condition, i.e., when the LNA 222 is turned on and the PA 202 is turned off. The receiver matching network is constructed to transform turned-on input impedance of the LNA 222 to match with the combined loading of the turned-off output impedance of the PA 202 and the antenna port loading of the antenna port, and also take into account the transmission line 246 in the TR switch 24. The receiver matching network 220 may further include a bandpass filter producing a filtered RF signal to the LNA 222, which amplifies an incoming RF signal $S_{in}$, while adding little or no noise and distortion to the amplified RF signal. The amplified incoming RF signal $S_{in}$ is transferred to a receiver front end (not shown), where filtering processes, down-conversion, and analog to digital conversion is performed to output a baseband signal for processing by the baseband module 26.

The TR switch 24 controls connection and disconnection of a transmit path to the transmitter 20 and a receive path to the receiver 22, such that the transmitter 20 and receiver 22 can share the same antenna 28 for outgoing and incoming transmission. The TR switch 24 employs a transmission line 246 to isolate the input impedance of the LNA 222 and part of the pad and ESD capacitance from the PA 202. Assumed in absence of the transmission line 246, the antenna port loading at the antenna port 244 might include loading due to PA output, LNA input, ESD, pad, power detector, bump to bump capacitance, resulting in a small inductor with inductance $L_{load}$. Given that the voltage V and inductance $L_{load}$ is related by the expression $V=IwL_{Load}$, the small inductance $L_{load}$ renders increased current requirement to provide a voltage swing of $2V_{DD}$ with the voltage $V_{DD}$ being a full swing of the voltage V, therefore efficiency of the PA 202 is reduced. In presence of the transmission line 246, as illustrated in the embodiment, the antenna port loading at antenna port 244 is reduced, since the LNA input impedance and part of the pad and ESD capacitance are isolated by the transmission line 246, leading to decreased current requirement and increased PA efficiency.

The TR switch 24 in the present invention employs a transmission line which can be of any length. In practice, longer transmission line introduces more loss. In some implementations, the transmission line has a length less than a quarter of a wavelength of the outgoing RF signal $S_{out}$ to provide reduced circuit area, increased signal quality, and a more flexible circuit floor planning in comparison to the conventional TR switch. The TR switch 24 includes a network connection to couple the transmitter 20 to the antenna 28 for data transmission and to disable a communication path between the antenna 28 and the receiver 22 to prevent the LNA 222 from receiving unwanted outgoing RF signal $S_{out}$, or, alternatively, to disable the PA 202 from producing the amplified outgoing RF signal to the antenna 28 while enabling the communications path from the antenna 28 to the receiver 22 for the data reception. The TR switch 24 comprises a transmitter port 240, a receiver port 242, an antenna port 244 and the transmission line 246. A control switch (not shown in FIG. 2) can be inserted between the transmission line 246 and the LNA 222. For example, in one implementation, the control switch is implemented in the receiver matching network 220 or in the TR switch 24; in another implementation, the control switch is implemented on the path between the transmission line 246 and the receiver matching network 220.

Figure 4A:
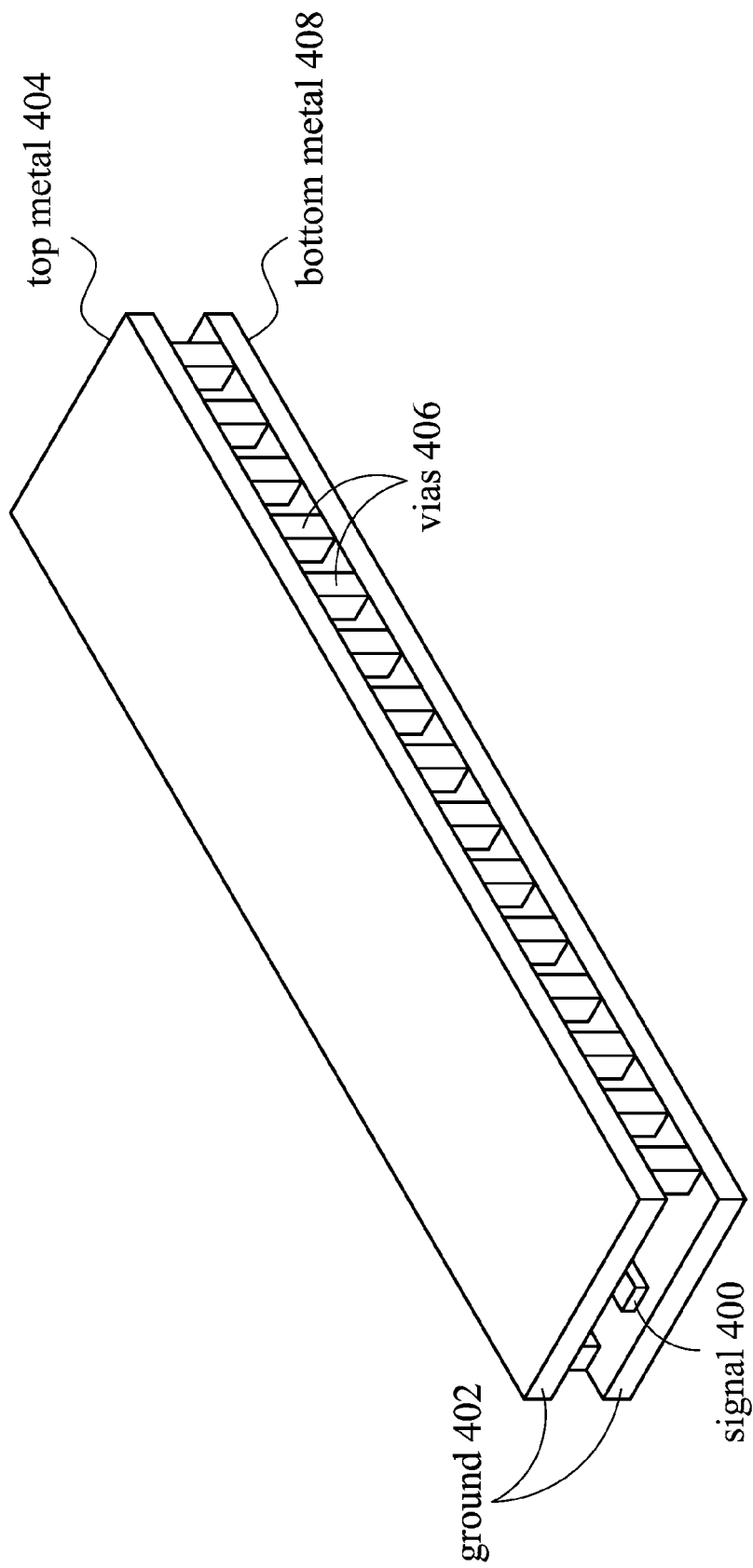
FIGS. 4A, B, and C illustrate physical implementation, a block diagram, and an equivalent circuit of the transmission line.
Figure 4B:
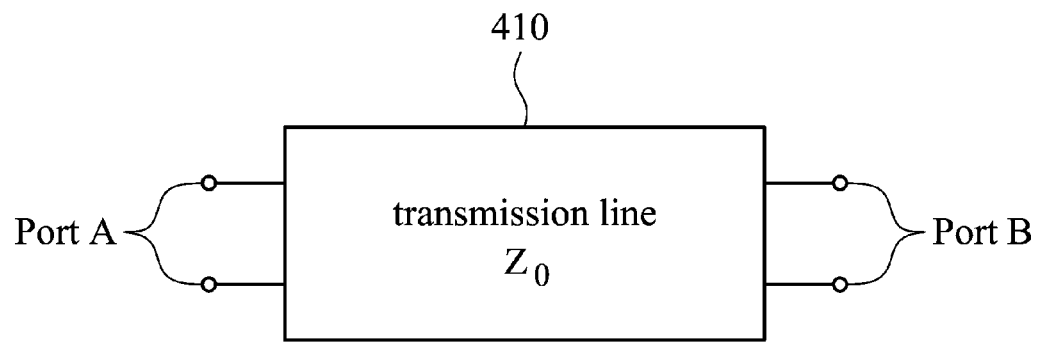

On the transmission line, the voltage and current vary along the line path. FIGS. 4A, B, and C illustrate physical implementation, a block diagram, and an equivalent circuit of an example of the transmission line. The example of transmission line is regarded as an ideal loseless line, specialized to carry alternating current of a radio frequency. That is, currents with a frequency high enough that its wave nature must be taken into account. Refer to FIG. 4A, the transmission line comprises signal line 400, ground layers 402, top metal 404, vias 406, and bottom metal 408. The signal line 400 carries the RF signals to and from the antenna. The transmission line can be in the form of a coaxial cable, a microstrip, a stripline, a balanced line, a twisted pair, a combination thereof or other available types. FIG. 4B shows the transmission line modeled as a two-port network, comprising a transmission line 410 with a characteristic impedance $Z_o$, Port A and Port B. The two-port network is assumed to be linear, or, the complex voltage across either port is proportional to the complex current flowing into the port when there are no reflections, and the two ports are assumed to be interchangeable. The transmission line 410 is uniform along the length thereof, and the behaviour is largely described by a single parameter called the characteristic impedance, symbol $Z_0$, represented by a ratio of the complex voltage of a propogation wave to the complex current of the same wave at any point on the line 410. Typical values of $Z_0$ are 50 or 75 ohms for a coaxial cable, about 100 ohms for a twisted pair of wires, and about 300 ohms for a common type of untwisted pair used in radio transmission. When sending a signal down a transmission line, it is usually desirable that as much power of the signal as possible will be absorbed by the load and as little as possible will be reflected back to the source. This can be ensured by making the load impedance equal to $Z_0$, in which case the transmission line is said to be matched.

Figure 4C:
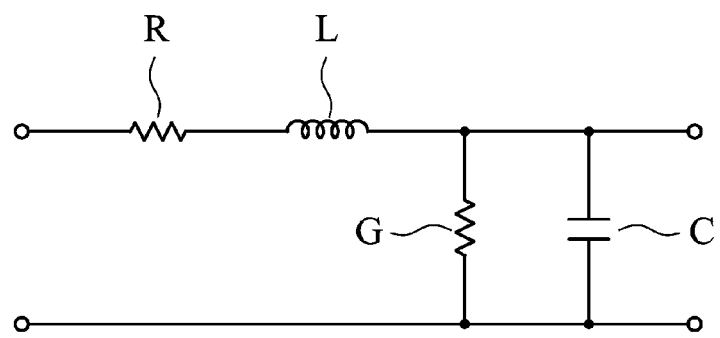

Refer to FIG. 4C, showing an equivalent circuit of the transmission line in FIG. 4A, comprising a resistance R and inductance L in Series with a capacitance C and conductance G in parallel. The resistance R and conductance C contribute to the loss of the transmission line. Some of the power fed into the transmission line is lost because of the resistance R, referred to as ohmic or resistive loss. At high frequencies, another effect called dielectric loss becomes significant, adding to the losses caused by resistance, arising from the insulating material inside the transmission line absorbs energy from the alternating electric field and converts it to heat. The voltage V(x) and current I(x) at each point x of the transmission line can be represented by the following expressions:

$$V(x) = V^+ e^{-\gamma x} + V^- e^{\gamma x} \qquad \text{Eq (1)}$$

$$I(x) = \frac{1}{Z_0}(V^+ e^{\gamma x} - V^- e^{\gamma x}) \qquad \text{Eq (2)}$$

where
$$\gamma = \sqrt{(R+j\omega L)(G+j\omega C)}, \text{ and}$$
$$Z_0 = \sqrt{\frac{R+j\omega L}{G+j\omega C}}.$$

In some implementations, another transmission line (not shown) can be inserted between the antenna port 244 and the antenna 28. In further other implementations, the antenna port 244 is configured to directly connect to the antenna 28.

The transmitter port 240 is configured to directly connect to the transmitter matching network 204. The receiver port 242 is configured to directly connect to the receiver matching network 220, and to the transmitter port 240 and the antenna port 244 through the transmission line 246 having a length less than a quarter of a wavelength of the outgoing RF signal $S_{out}$. The control switch controls connection and disconnection of the transmit path and receive path to the antenna 28, and may be realized by a transistor or a diode. When the control switch is closed, the TR switch 24 enables the transmit path between the transmitter 20 and the antenna 28 for the outgoing RF signal $S_{out}$ and disables the receive path to prevent the transmit power from being absorbed by the LNA 222. Conversely, when the control switch is opened, the TR switch 24 enables the receive path between the antenna 28 and receiver 22 for the incoming RF signal $S_{in}$, and disables the transmit path to prevent the received signal from being absorbed by the PA 202.

In the embodiment, the transmission line 246 has a length less than a quarter of a wavelength of the outgoing RF signal $S_{out}$. Because the length of the transmission line is not one quarter wavelength long and the voltage and current vary with the line length, the design of the receiver matching network 220 needs to take the transmission line length into account, such that the turned-on input terminal of the LNA 222 in combination with the matching network filter 220 produces a matched impedance matching to the combined loading of the turned-off output impedance of the PA 202 and the antenna port loading of the antenna port, in the presence of the non-quarter-wavelength transmission line.

The TR switch 24 in the embodiment using the transmission line of any length, offering circuit layout flexibility, decreased insertion loss, reduce circuit area, and decreased manufacturing cost, while providing circuit isolation between the transmitter and receiver during data transmission and reception.

Figure 3:
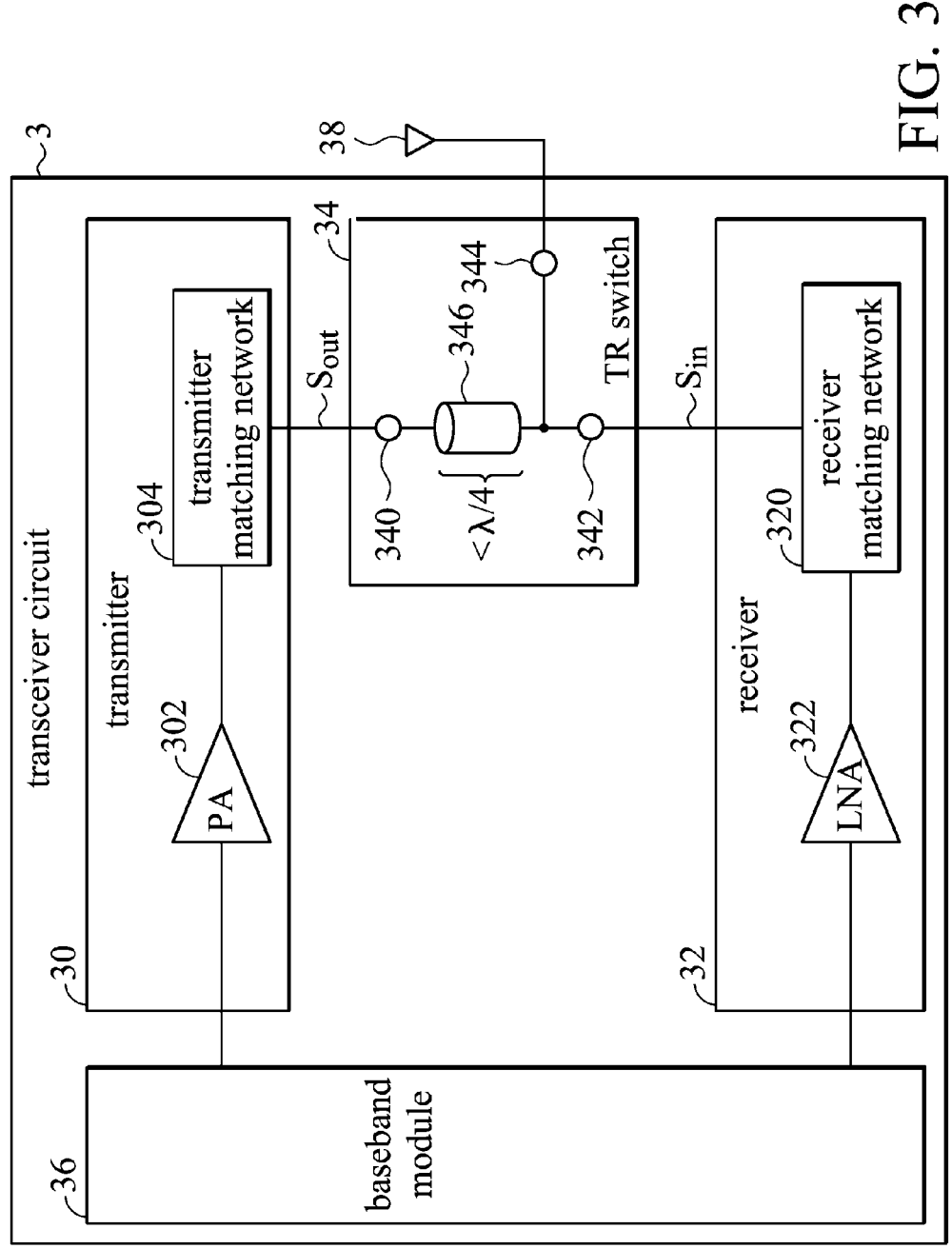
FIG. 3 is a block diagram of a radio transceiver circuit 3 according to another embodiment of the invention.

FIG. 3 is a block diagram of a radio transceiver circuit 3 according to another embodiment of the invention, comprising a transmitter 30, a receiver 32, a TR switch 34, and a baseband module 36. The transceiver circuit 3 may be implemented in an integrated circuit (IC) or a discrete circuit comprising the illustrated blocks. The transmitter 30, the receiver 32, and the baseband module 36 are identical to the transmitter 20, the receiver 22, and the baseband module 26, thus explanations can be found in the preceding paragraphs. The TR switch 34 comprises a transmitter port 340, a receiver port 342, an antenna port 344, and a transmission line 346. A control switch (not shown in FIG. 3) can be inserted between the transmission line 346 and the PA 302. For example, in one implementation, the control switch is implemented in the transmitter matching network 304 or the TR switch 34; in another implementation the control switch is implemented on the path between the transmission line 346 and the transmitter matching network 304. The TR switch 34 is different from the TR switch 24 on the connection of the transmission line 346 and the switch 340. The transmission line 346 can be of any length. In one implementation, the transmission line 346 has the length less than one quarter wavelength of the incoming RF signal $S_{in}$. In some implementations, another transmission line (not shown) is inserted between the antenna port 344 and the antenna 38. In other implementations, the antenna port 344 is configured to directly connect to an antenna 38. The receiver port 342 is configured to directly connect to the receiver filter 320. The transmitter port 340 is configured to directly connect to the transmitter filter 304, and to the receiver port 342 and the antenna port 344 through the transmission line 346. The control switch controls connection and disconnection of the transmit path and receive path to the antenna 38, and may be realized by a transistor or a diode. When the control switch is closed, the TR switch 34 enables the receive path between the antenna 38 and receiver 32 for the incoming transmission and disables the transmit path to prevent the received signal from being absorbed by the PA 302. Conversely, when the control switch is opened, the TR switch 34 enables the transmit path between the transmitter 30 and the antenna 38 for the outgoing transmission and disables the receive path to prevent the transmit power from being absorbed by the LNA 322. Because the length of the transmission line 346 is not one quarter wavelength long and the voltage and current vary with the line length, the design of the receiver filter 320 needs to take the transmission line length into account, such that the turned-on input terminal of the LNA 322 in combination with the receiver filter 320 produces a matched impedance matching to the combined loading of the turned-off output impedance of the PA 302 and the antenna port loading of the antenna port 344, in the presence of the non-quarter-wavelength transmission line 346.

Because the transmission line 346 is not placed on the receive path to the receiver, the configuration of the TR switch 34 provides enhanced receiver sensitivity comparing to the TR switch 24 in the radio transceiver circuit 2. Since the transmission line 346 can be of any length, and in particularly, can be a length less than the quarter wavelength of the incoming RF signal $S_{in}$, the TR switch 34 provides circuit layout flexibility, reduced circuit area, and decreased manufacturing cost, while maintaining circuit isolation between the transmitter and receiver in operation.

Although the transmission line is located on either the receive path or the transmit path in the radio transceiver ICs 2 and 3, those skilled in the art will recognize that the transmission lines and the grounding switches may be incorporated on both the transmit and receive paths, using the principle of the invention.

Referring to FIG. 2, when considering the circuit design for the transmitter matching network 204 and receiving matching network 220, the following procedure can be adopted. To begin, the transmitter matching network is designed to match the turned-on output impedance of the PA 202 to the combined loading of the port loading of the antenna port 244 and the turned-off input impedance of the LNA 222. The line length of the transmission line 246 is determined according to the actual physical floor planning of the transmitter, the receiver, and the TR switch circuitry. A shortest distance between the antenna port 244 and the receiver 22 may be selected as the line length, which can be less than a quarter wavelength. The receiver matching network is the next to be designed to match the turn-on input impedance of the LNA 222 in accordance to the combined loading of the antenna port 244, the turned-off output impedance of the PA 202, and the effect of the line length of the transmission line 246.

Referring to FIG. 3, when considering the circuit design for the transmitter matching network 304 and receiving matching network 320, the following procedure can be adopted. To begin with, the transmitter matching network is designed to match the turned-on output impedance of the PA 302 to the combined loading of the port loading of the antenna port 344 and the turned-off input impedance of the LNA 322. The line length of the transmission line 346 is determined according to the actual physical floor planning of the transmitter 30, the receiver 32, and the TR switch 34 circuitry. A shortest distance between the antenna port 344 and the receiver 32 may be selected as the line length, which can be less than a quarter wavelength. Having the transmission line 346 being inserted between the antenna port and the PA 302, the transmitter matching network is then adjusted to accommodate the effect of the line length of the transmission line 346. Lastly, the receiver matching network is designed to match the turn-on input impedance of the LNA 322 in accordance to the combined loading of the antenna port 244, and the turned-off output impedance of the PA 302.

Figure 5:
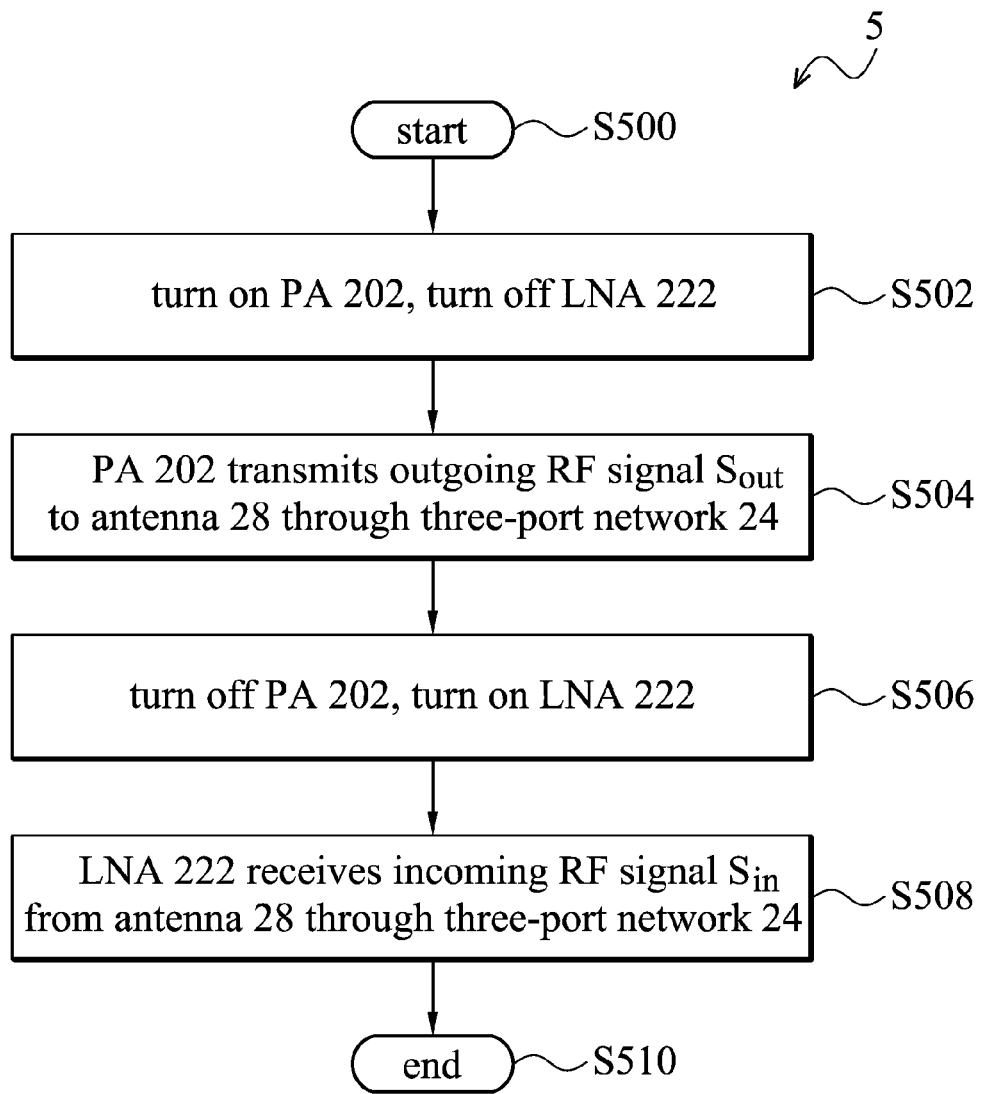
FIG. 5 is a flowchart of a transmission and reception method 5 performed by the radio transceiver circuit 2 according to an embodiment of the invention.

FIG. 5 is a flowchart of a transmission and reception method 5 performed by the radio transceiver circuit 2 according to an embodiment of the invention. Upon startup, the radio transceiver circuit 2 is initialized for transmitting and receiving RF signals (S500). During transmission, the PA 202 is turned on and the LNA 222 is turned off (S502), so that the PA 202 can transmit the outgoing RF signal $S_{out}$ to the antenna 28 through the three-port network 24 detailed in the preceding explanation (S504). During reception, the PA 202 is turned off and the LNA 222 is turned on (S506), so that the LNA is enabled to receive the incoming RF signal $S_{in}$ to the antenna 28 through the three-port network 24, as detailed FIG. 2 (S508). The three-port network 24 comprises the transmission line 246 located on the receive path, resulting in When the radio transceiver circuit 2 is no longer required to perform data communication, the transmission and reception method 5 is exited and completed (S510).

Figure 6:
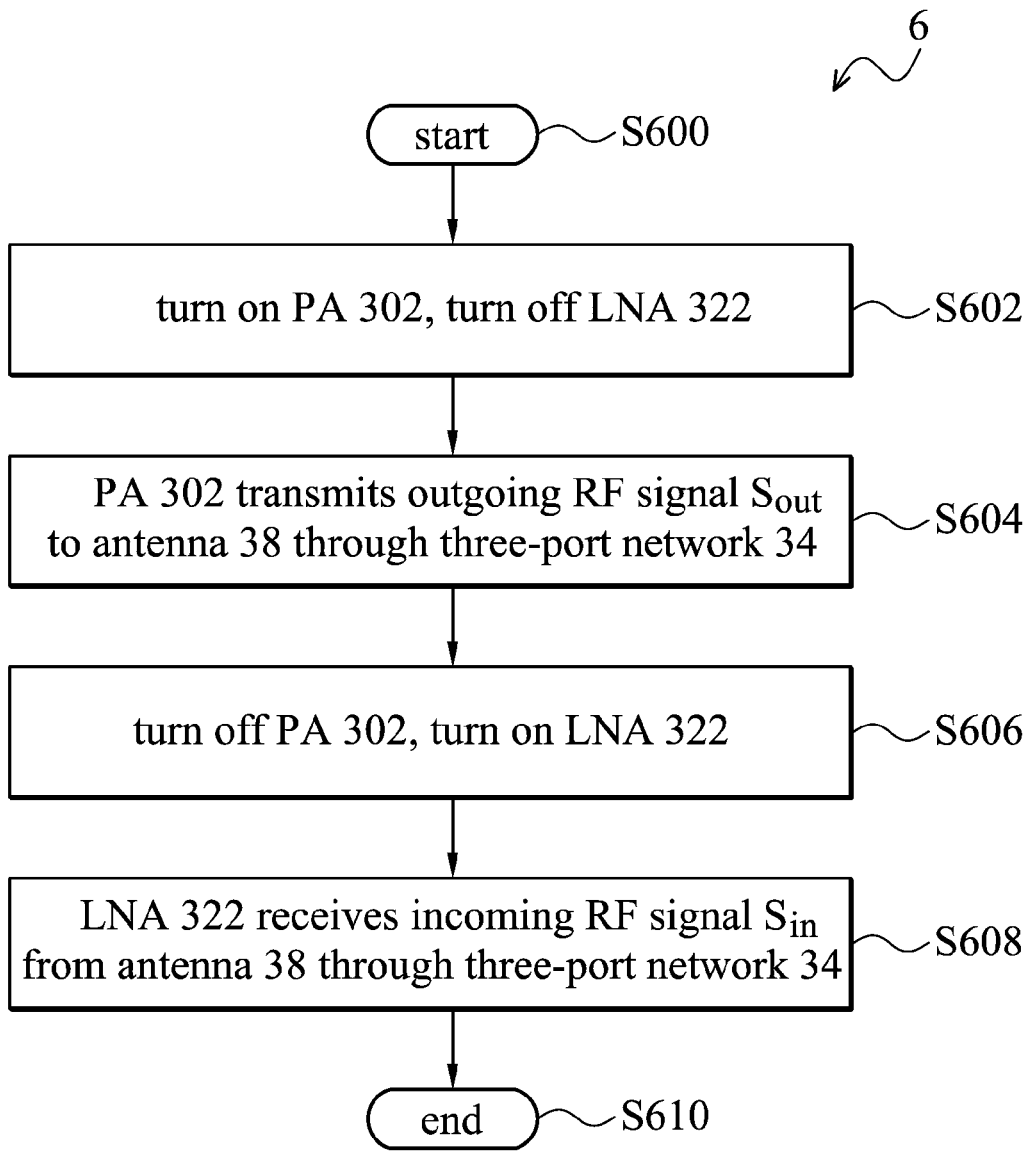
FIG. 6 is a flowchart of a transmission and reception method 6 performed by the radio transceiver circuit 3 according to an embodiment of the invention.

FIG. 6 is a flowchart of a transmission and reception method 6 performed by the radio transceiver circuit 3 according to an embodiment of the invention. Upon startup, the radio transceiver circuit 3 is initialized for transmitting and receiving RF signals (S600). During transmission, the PA 202 is turned on and the LNA 222 is turned off (S602), so that the PA 202 can transmit the outgoing RF signal $S_{out}$ to the antenna 28 through the three-port network 24 detailed in the preceding explanation (S604). During reception, the PA 202 is turned off and the LNA 222 is turned on (S606), so that the LNA is enabled to receive the incoming RF signal $S_{in}$ to the antenna 28 through the three-port network 24, as detailed FIG. 2 (S608). When the radio transceiver circuit 3 is no longer required to perform data communication, the transmission and reception method 6 is exited and completed (S610).

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transceiver, comprising:
   a transmitter, configured to transmit an outgoing RF signal;
   a receiver, configured to receive an incoming RF signal; and
   a three-port network, comprising:
   a transmission line, configured to have a line length less than a quarter of a wavelength of the incoming RF signal;
   an antenna port, configured to connect to an antenna;
   a receiver port, configured to connect the receiver to the antenna port; and
   a transmitter port, configured to connect the transmitter to the antenna port;
   wherein the antenna port, the receiver port and the transmitter port are connected through the transmission line such that the line length between the receiver port, the antenna port and the transmitter port is less than a quarter of a wavelength of the incoming RF signal.

2. The transceiver of claim 1, wherein:
   the receiver further comprises a receiver amplifier; and
   the transmitter further comprises:
   a transmitter amplifier; and
   a transmitter matching network, connected to the transmitter amplifier, configured to match a transmitter output impedance of the transmitter amplifier in response to a first impedance at the antenna port and a second impedance at a receiver amplifier input of the receiver amplifier.

3. The transceiver of claim 2, wherein the transmitter output impedance is an output impedance of the transmitter amplifier when the transmitter amplifier is turned on, and the receiver input impedance is an input impedance of the receiver amplifier when the receiver amplifier is turned off.

4. The transceiver of claim 1, wherein:
   the transmitter further comprises a transmitter amplifier; and
   the receiver further comprises:
   a receiver amplifier; and
   a receiver matching network, connected to the receiver amplifier, configured to match a receiver input impedance of the receiver amplifier in response to a first impedance at the antenna port, a second impedance at a transmitter amplifier output of the transmitter amplifier, and an effect of the line length of the transmission line.

5. The transceiver of claim 4, wherein the receiver input impedance is an input impedance of the receiver amplifier when the receiver amplifier is turned on, and the transmitter output impedance is an output impedance of the transmitter amplifier when the transmitter amplifier is turned off.

6. A transceiver, comprising:
   a transmitter, configured to transmit an outgoing RF signal;
   a receiver, configured to receive an incoming RF signal; and
   a three-port network, comprising:
   a transmission line, configured to have a line length less than a quarter of a wavelength of the outgoing RF signal;
   an antenna port, configured to connect to an antenna;
   a transmitter port, configured to connect the transmitter to the antenna port; and
   a receiver port, configured to connect the receiver to the antenna port;
   wherein the antenna port, the receiver port and the transmitter port are connected through the transmission line such that the line length between the transmitter port, the antenna port and the receiver port is less than a quarter of a wavelength of the outgoing RF signal.

7. The transceiver of claim 6, wherein:
   the receiver further comprises a receiver amplifier; and
   the transmitter further comprises:
   a transmitter amplifier; and
   a transmitter matching network, connected to the transmitter amplifier, configured to match a transmitter output impedance of the transmitter amplifier in response to a first impedance at the antenna port, a second impedance at a receiver amplifier input of the receiver amplifier, and an effect of the line length of the transmission line.

8. The transceiver of claim 7, wherein the transmitter output impedance is an output impedance of the transmitter amplifier when the transmitter amplifier is turned on, and the receiver input impedance is an input impedance of the receiver amplifier when the receiver amplifier is turned off.

9. The transceiver of claim 6, wherein:
   the transmitter further comprises a transmitter amplifier; and
   the receiver further comprises:
   a receiver amplifier; and
   a receiver matching network, connected to the receiver amplifier, configured to match a receiver input impedance of the receiver amplifier to a first impedance at the antenna port and a second impedance at a transmitter amplifier output of the transmitter amplifier.

10. The transceiver of claim 9, wherein the receiver input impedance is an input impedance of the receiver amplifier when the receiver amplifier is turned on, and the transmitter output impedance is an output impedance of the transmitter amplifier when the transmitter amplifier is turned off.

11. A method executed by a transceiver, comprising:
    turning on, by the transceiver, a transmitter amplifier of the transceiver, and turning off a receiver amplifier of the transceiver; and
    transmitting, by the transceiver, an outgoing RF signal from the transmitter amplifier to an antenna through a three-port network,
    wherein the three-port network comprises:
    a transmission line, configured to have a line length less than a quarter of a wavelength of the incoming RF signal;

an antenna port, configured to connect to the antenna;

a receiver port, configured to connect the receiver to the antenna port; and a transmitter port, configured to connect the transmitter to the antenna port;

wherein the antenna port, the receiver port and the transmitter port are connected through the transmission line such that the line length between the receiver port, the antenna port and the transmitter port is less than a quarter of a wavelength of the incoming RF signal.

12. The method of claim 11, wherein the transmitting step comprises transmitting the outgoing RF signal from the transmitter amplifier to the three-port network via a transmitter matching network, wherein the transmitter matching network is configured to match a transmitter output impedance of the transmitter amplifier in response to a first impedance at the antenna port and a second impedance at a receiver amplifier input of the receiver amplifier.

13. The method of claim 12, wherein the transmitter output impedance is an output impedance of the transmitter amplifier when the transmitter amplifier is turned on, and the receiver input impedance is an input impedance of the receiver amplifier when the receiver amplifier is turned off.

14. The method of claim 11, further comprising:

turning on the receiver amplifier, and turning off the transmitter amplifier; and receiving in incoming RF signal from the antenna to the receiver through the three port network;

wherein the receiving step comprises receiving the incoming RF signal from the three port network to the receiver via a receiver matching network; and the receiver matching network is configured to match a receiver input impedance of the receiver amplifier in response to a first impedance at the antenna port, a second impedance at a transmitter amplifier output of the transmitter amplifier, and an effect of the line length of the transmission line.

15. The method of claim 14, wherein the receiver input impedance is an input impedance of the receiver amplifier when the receiver amplifier is turned on, and the transmitter output impedance is an output impedance of the transmitter amplifier when the transmitter amplifier is turned off.

16. A method executed by a transceiver, comprising:

turning on, by the transceiver, a transmitter amplifier of the transceiver, and turning off a receiver amplifier of the transceiver; and transmitting, by the transceiver, an outgoing signal from the transmitter amplifier to an antenna through a three-port network, wherein the three-port network comprises:

a transmission line, configured to have a line length less than a quarter of a wavelength of the outgoing RF signal;

an antenna port, configured to connect to an antenna;

a transmitter port, configured to connect the transmitter to the antenna port; and a receiver port, configured to connect the receiver to the antenna port;

wherein the antenna port, the receiver port and the transmitter port are connected through the transmission line such that the line length between the transmitter port, the antenna port and the receiver port is less than a quarter of a wavelength of the outgoing RF signal.

17. The method of claim 16, wherein the transmitting step comprises transmitting the outgoing RF signal from the transmitter amplifier to the three-port network via a transmitter matching network, wherein the transmitter matching network is configured to match a transmitter output impedance of the transmitter amplifier in response to a first impedance at the antenna port, a second impedance at a receiver amplifier input of the receiver amplifier, and an effect of the line length of the transmission line.

18. The method of claim 17, wherein the transmitter output impedance is an output impedance of the transmitter amplifier when the transmitter amplifier is turned on, and the receiver input impedance is an input impedance of the receiver amplifier when the receiver amplifier is turned off.

19. The method of claim 16, further comprising:

turning on the receiver amplifier, and turning off the transmitter amplifier; and receiving in incoming RF signal from the antenna to the receiver through the three port network, wherein, the receiving step comprises receiving the incoming RF signal from the three port network to the receiver via a receiver matching network, and the receiver matching network is configured to match a receiver input impedance of the receiver amplifier to a first impedance at the antenna port and a second impedance at a transmitter amplifier output of the transmitter amplifier.

20. The method of claim 19, wherein the receiver input impedance is an input impedance of the receiver amplifier when the receiver amplifier is turned on, and the transmitter output impedance is an output impedance of the transmitter amplifier when the transmitter amplifier is turned off.

* * * * *